June 17, 1924.
A. W. OLDS
1,498,113
MECHANISM FOR ACTUATING AUTOMOBILE SPEED AND STOP SIGNALS
Filed March 22, 1922
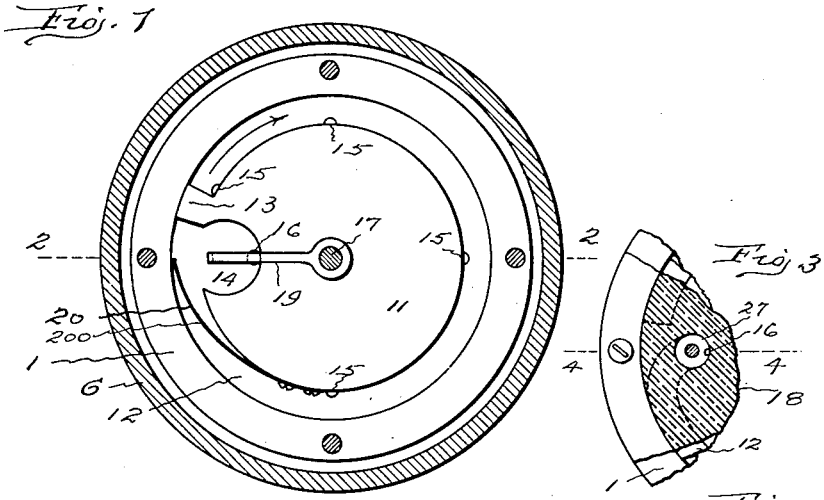
INVENTOR
Alfred W. Olds by
Harry R. Williams
ATTORNEY Patented June 17, 1924.

1,498,113

UNITED STATES PATENT OFFICE.

ALFRED W. OLDS, OF WINDSOR, CONNECTICUT.

MECHANISM FOR ACTUATING AUTOMOBILE SPEED AND STOP SIGNALS.

Application filed March 22, 1922. Serial No. 545,769.

*To all whom it may concern:*

Be it known that I, ALFRED W. OLDS, a citizen of the United States, residing at Windsor, in the county of Hartford and State of Connecticut, have invented a new and useful Improvement in Mechanism for Actuating Automobile Speed and Stop Signals, of which the following is a specification.

This invention relates to apparatus designed to be placed on pleasure and commercial automobiles for indicating changes in the rate of travel of the vehicle.

The object of the invention is to provide a simple and effective apparatus of this character which will automatically control an electric circuit that includes a signal lamp or other indicating means, in such manner that the lamp will not glow or the indicating means will show clear when the vehicle is running at any uniform rate of speed but the lamp will glow or the means will indicate reduction of speed when the speed of the vehicle is retarded and for a limited time after the vehicle has stopped.

This object is attained by placing mercury or a similar liquid conductor in a chambered member that is designed to be driven from a rotating part of the vehicle, which member is so constructed and provided with conducting means adapted to be connected in the lamp or indicator circuit, that when the vehicle slows down and the rotation of the chambered member is retarded, the liquid conductor will owing to its momentum connect the conducting means and close the lamp or indicator circuit and keep the circuit closed until the vehicle has remained at rest for some time or until it has again attained a uniform speed of travel.

In the accompanying drawings Figure 1 shows a horizontal section taken on the plane indicated by the dotted line 1—1 on Fig. 2, of an apparatus which embodies the invention. Fig. 2 shows a vertical section taken on the plane indicated by the dotted line 2—2 on Fig. 1. Fig. 3 is a fragmentary section on the line 3—3 of Fig. 4 showing a modified feature of the invention. Fig. 4 is a section on the line 4—4 of Fig. 3.

The chambered member 1 which is illustrated is cup-shaped and is fastened to the upper end of a vertical spindle 2 which is designed to be rotated by a connection with some rotating part of the vehicle. The spindle is shown as held by anti-friction bearings 3, 4 arranged in the hub 5 of a casing 6 that encloses the chambered member. A plate 7 is fastened over the open end of the casing, and the hub of the casing is designed to be attached to some suitable support fixed to the vehicle with which the apparatus is to be used.

In the form of rotatable member shown two chambers are provided by placing a partition in the shape of a conical diaphragm 8 inside above the bottom of the cup-shaped piece. This partition has a small opening 9 at its lowest point and openings 10 near its edge. Above the diaphragm is a disk 11 desirably made of insulating material. In the upper face of this disk about its edge is a chamber 12. This chamber which is further from the axis than the other chambers is almost but not quite annular, one end being separated from the other by a wall 13. At one end of the upper and outer chamber is a pocket 14. This pocket is on the inside, or nearer the axis of rotation of the disk. Passages 15 are made at intervals through the bottom of the disk to the chamber 12, and a small passage 16 is made through the disk at the bottom of the pocket. At the center of the disk is a conducting stud 17 that extends downward nearly to the bottom of the intermediate chamber and that extends upward through the plate 18, preferably of insulating material, that covers the open upper end of the rotatable chambered member. In this form a conducting finger 19 is arranged to extend from the stud into the pocket where its end is turned down a little inside of the inner wall of the chamber 12. A light leaf spring 20 may be arranged in the chamber 12 with one end fastened to the inner wall of the chamber and the free end extending toward the outer wall of the chamber. This spring acts as a gate and may have an opening through it at 200 to permit the flow of liquid.

On the cover of the fixed casing and insulated therefrom is a binding post 21 containing a contact 22, desirably of carbon, that is pressed by a spring 23 down into engagement with the contact stud in the top of the chambered member. One end of the signal circuit 24, that includes a lamp 25 or other indicating means and a battery 26 is connected with the binding post. The chambered member or its spindle is in electrical connection with the other or grounded end of the battery circuit.

Mercury or a similar heavy liquid conductor is placed in the bottom of the rotatable chambered member. The quantity of mercury is somewhat less than that which would fill the chamber 12. The spindle is so connected that when the vehicle is running forward the chambered member is rotated in the direction indicated by the arrow on Fig. 1. When the chambered member is rotated the mercury under centrifugal action flows up through the holes 10 in the diaphragm and holes 15 in the disk into the chamber 12. With the vehicle running at a uniform speed the mercury is held by centrifugal force against the outer side of this chamber. Whenever the vehicle slows down the mercury due to its momentum tends to continue its rotation and this causes the mercury to flow past the spring gate 20 and spread out into the pocket 14 so as to make electrical connection between the grounded wall of the rotatable member and the contact finger that is connected with the stud which is engaged by the carbon brush connected with the other end of the circuit. This causes the lamp to glow and the lamp remains glowing by means of these connections until the mercury has had time to drain through the holes into the diaphragm if the vehicle has come to rest or until the mercury has again been thrown out by centrifugal action, if the speed of the vehicle remains constant or its speed has increased. The mercury in the diaphragm makes an electrical connection between the stud and the grounded diaphragm until it has drained through the opening 9 back into the lower chamber. Thus when the vehicle is slowing down from any speed and for a period thereafter depending upon the rapidity of draining of the mercury through the openings or until the speed of the vehicle has become uniform, the lamp continues to glow. After the vehicle has been at rest for sometime and the mercury has drained into the lower central chamber the connections are broken and the light goes out. If the speed of the vehicle is again resumed after it has slowed down, the mercury by centrifugal action is thrown out so as to accumulate around the outer edge of the chamber 12 without any electrical connection between the chambered member and the contact stud.

In the form described the circuit is closed when the speed of the vehicle is reduced, by the spreading of the mercury into the pocket. In the modified form illustrated substantially the same action takes place except that the chamber in the disk 11 is curved around to the lower end of a pocket 27 in the covering plate 18 and an adjustable screw 28 is turned into this pocket so that when the vehicle is retarded the mercury due to its momentum will flow around and rise up in the pocket and make electrical connection between the rotatable member and the screw, which may be connected by a wire or plate 29 with the central stud.

This apparatus is very sensitive, and the circuit is closed through the mercury or other liquid conductor whenever the vehicle is slowed down from any speed above that which is sufficient to cause the mercury by centrifugal action to flow up into the outer chamber. The circuit remains closed so that the indicator will be active until after the vehicle has stopped or until it has resumed a uniform rate of speed. The particular form of chambers shown is not essential to the invention, their shapes may be changed, as long as there is a lower chamber and a higher chamber that is located further from the axis of rotation and into which the mercury will flow from the lower chamber under centrifugal action, with an intermediate chamber containing an electrical contact, without departing from the invention.

The invention claimed is:

1. Mechanism for actuating an automobile signal comprising a rotatable conducting member having a chamber containing a liquid conductor and a chamber more distant from the axis, and communicating therewith whereby under centrifugal action the liquid conductor will flow from the inner chamber into the outer chamber, said outer chamber being formed so as to rotatably carry the liquid conductor with the member at the same speed when the speed of rotation of the rotatable member is uniform, but permit the liquid conductor to run faster than the member when the speed of the member is being retarded, an electrical conductor carried by and insulated from the rotatable member and extending into the outer chamber, said conductor being adapted to be electrically connected with the member through the medium of the liquid conductor in the outer chamber when the rotation of the member is being retarded, a casing enclosing the chambered rotatable member, and a conductor on and insulated from the casing and in electrical connection with the conductor on said member.

2. Mechanism for actuating an automobile signal comprising a rotatable conducting member having a lower central chamber containing a liquid conductor and an outer and higher chamber communicating therewith whereby under centrifugal action the liquid conductor will flow from the lower chamber into the higher chamber, said outer chamber being formed so as to rotatably carry the liquid conductor with the member at the same speed when the speed of rotation of the rotatable member is uniform, but permit the liquid conductor to run faster than the member when the speed of the member is being retarded, an electrical conductor carried by and insulated from said member and extending into the outer chamber, said conductor being adapted to be electrically connected with the member through the medium of the liquid conductor when the rotation of the member is being retarded, and a conductor in electrical connection with the conductor on said member.

3. Mechanism for actuating an automobile signal comprising a rotatable member having a central chamber containing a liquid conductor and a chamber further from the center with a terminal pocket communicating with said outer chamber, whereby under centrifugal action the liquid conductor will flow from the central chamber into the outer chamber, and when the rotation of said member is retarded the liquid conductor will flow from the outer chamber into the pocket, means for allowing the liquid conductor to drain from the pocket, an electrical conductor carried by and insulated from said member and extending into the pocket and adapted to be electrically connected with the member through the medium of the liquid conductor when the member rotates slower than the liquid conductor, a casing enclosing the rotatable member, and a conductor on and insulated from the casing and in electrical connection with the conductor on said member.

4. Mechanism for actuating an automobile signal comprising a rotatable member having a central chamber containing a liquid conductor and a chamber further from the center connected therewith, a perforated diaphragm located in said member between the chambers whereby under centrifugal action the liquid conductor will flow from the central chamber through the diaphragm into the outer chamber, an electrical conductor carried by and insulated from the member and adapted at times to be electrically connected through the medium of the liquid conductor with the member and connected at other times through the liquid conductor with the diaphragm, a casing enclosing the rotatable member, and a conductor insulated from the casing and in electrical connection with the conductor on said member.

5. Mechanism for actuating an automobile signal comprising a rotatable cup-shaped member carrying a perforated conical diaphragm and having a chamber above the diaphragm with means whereby under centrifugal action liquid conductor may flow from said member through the diaphragm into said chamber, an electrical conductor carried by and insulated from the member and adapted to be electrically connected through the medium of liquid conductor with the member and with the diaphragm, a casing enclosing the rotatable member, and a conductor on and insulated from the casing and in electrical connection with the conductor on said member.

6. Mechanism for actuating an automobile signal comprising a rotatable cup-shaped member carrying a perforated conical diaphragm and having a chamber above the diaphragm with means whereby under centrifugal action liquid conductor may flow from said member through the diaphragm into said chamber, an electrical conductor carried by the member and extending into the chamber and adjacent to the apex of the diaphragm, an enclosing case, and a conductor on the case in electrical connection with the conductor on the member.

7. Mechanism for actuating an automobile signal comprising a spindle, a cup-shaped member attached to the spindle, a conical diaphragm located in said member with passages through the diaphragm, an insulating disk in the top of said member, said disk having a chamber near its edge with openings through the bottom of the disk from the chamber, conducting means mounted on the disk and extending into the chamber, a casing enclosing the member and supporting the spindle, a conductor carried by said casing, and mercury in said member and adapted to flow under centrifugal action through the openings in the diaphragm and disk into the chamber and occupy the chamber when the member is rotated at a uniform speed and make electrical connection with said conducting means on the disk when the speed of rotation of the member is retarded.

8. Mechanism for actuating an automobile signal comprising a spindle, a cup-shaped member attached to the spindle, a conical diaphragm located in the member with passages through the diaphragm near its edge and at the center, an insulating disk in the top of the member, said disk having a chamber about its edge with openings through the bottom of the disk from the chamber, a conductor mounted on the disk and extending into the chamber also near the apex of the diaphragm, a casing enclosing the member and supporting the spindle, a binding post mounted on the casing, a conductor carried by said post and engaging the conductor on the disk, and mercury in the member and adapted to flow under centrifugal action through the openings in the diaphragm and disk into the chamber and occupy the chamber when the member is rotated at a uniform speed and make electrical connection with the conductor on the disk when the speed of rotation of the member is retarded.

9. Mechanism for actuating an automobile signal comprising a spindle, a cup-shaped member attached to the spindle, a conical diaphragm located in said member with passages through the diaphragm, an insulating disk in the top of the member, said disk having a chamber about its edge with openings through the bottom of the disk from the chamber, a conducting stud mounted at the axis of the disk, a conductor extending from the stud into the chamber, a casing enclosing the member and supporting the spindle, a binding post on the casing, a conductor carried by said post and engaging said stud, and mercury in the member and adapted to flow under centrifugal action through the openings in the diaphragm and disk into the chamber and occupy the chamber when the member is rotated at an even and increasing speed and make electrical connection with the conductor extending from the stud when the speed of rotation of the member is retarded.

10. Mechanism for actuating an automobile signal comprising a spindle, a cup-shaped member attached to the spindle, a conical diaphragm located in said member with passages through the diaphragm near its edge and at the center, an insulating disk in the top of the member, said disk having a chamber about its edge with one end of the chamber terminating in a pocket that is nearer the axis of the disk than the chamber and having openings through the bottom of the disk from the chamber and pocket, a conducting stud mounted at the axis of the disk and extending to near the bottom of the diaphragm, a conducting finger extending from the stud into the pocket, a casing enclosing the rotatable member and supporting the spindle, a binding post mounted on the casing, a conductor carried by said post and engaging said stud, and mercury in the member and adapted to flow under centrifugal action through the openings in the diaphragm and disk into the chamber and occupy the chamber when the member is rotated at an even and increasing speed, and flow into the pocket and make electrical connection between the member and the finger when the speed of rotation of the member is retarded.

11. Mechanism for actuating an automobile signal comprising a rotatable conducting member containing a liquid conductor, an electrical conductor carried by and insulated from said member and adapted to be electrically connected with the member through the medium of the liquid conductor when the member rotates slower than the liquid conductor, a casing enclosing the member, and a conductor on and insulated from the casing and in electrical connection with the conductor on the member.

12. Mechanism for actuating an automobile signal comprising a rotatable conducting member having two chambers one being higher and further from the center than the other, with communication between the chambers, an electrical conductor located intermediate said chambers and carried by but insulated from said member, a liquid conductor adapted to occupy the inner and lower chamber when the member is at rest and occupy the outer and higher chamber when the member is rotating at an even speed, said liquid conductor making electrical connection between the member and electrical conductor carried thereby when the speed of rotation of the member is retarded, an enclosing case, and an electrical conductor on said case, and engaging the electrical conductor on said member.

13. Mechanism for actuating an automobile signal comprising a rotatable member having two chambers one being higher and further from the center than the other, with communication between the chambers, a liquid conductor adapted to occupy the inner and lower chamber when the member is at rest and occupy the outer and higher chamber when the member is rotating at an even speed, an enclosing case, and an electrical conductor on said case, said liquid conductor making electrical connection between the member and electrical conductor when the speed of rotation of the member is retarded.

14. Mechanism for actuating automobile signals comprising a rotatable conducting member having a chamber containing a liquid conductor that is adapted to be thrown outward under centrifugal action when said member is rotated, means in said chamber for causing the outwardly thrown liquid conductor to be rotatably carried with the member in the same speed when the speed of rotation of the member is uniform, but permit the liquid conductor to run faster than the member when the speed of the member is being retarded, and a conductor extending into the chamber and adapted to be electrically connected with the member through the medium of the liquid conductor when the rotation of the member is being retarded and the liquid conductor is caused to run faster than the member.

15. Mechanism for actuating an automobile signal comprising a rotatable member having a chamber, liquid conductor contained in the chamber and adapted to be thrown outward under centrifugal action by the rotation of the member, means in said chamber for causing the liquid conductor to be carried at the same speed as the member when the member is rotating at uniform speed, but which permits the liquid conductor to run faster than the member when the speed of the member is being retarded, and a conductor extending into the chamber and adapted to be electrically engaged by the liquid conductor when the speed of rotation of the member is being retarded and the liquid conductor is caused to run faster than the member.

ALFRED W. OLDS.